April 13, 1948.                    R. KEIL                    2,439,660
                          WHEELED TRUNK AND THE LIKE
                            Filed June 19, 1946
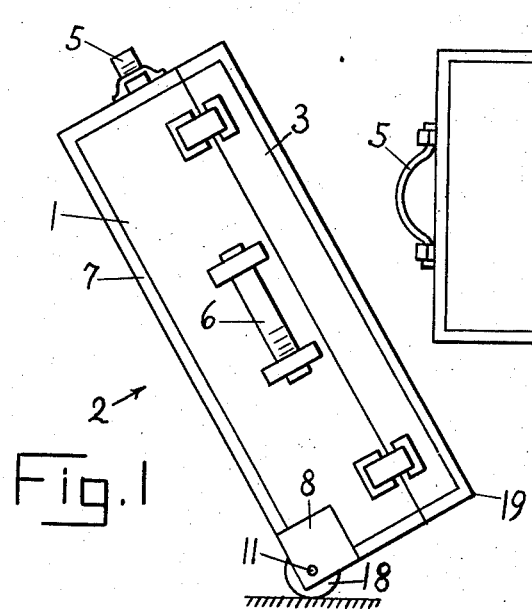
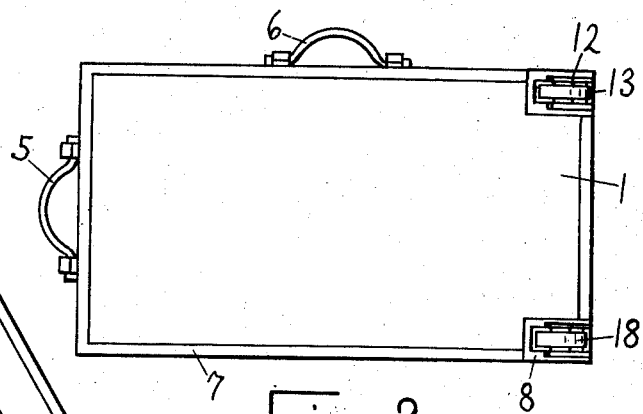
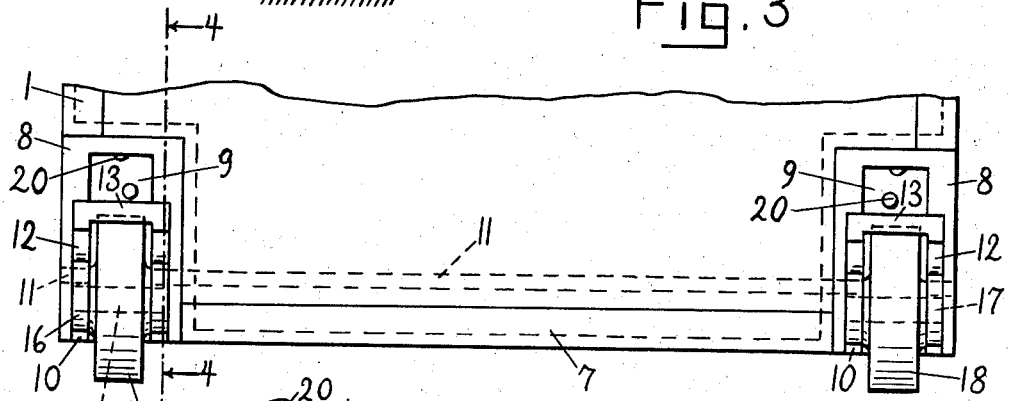
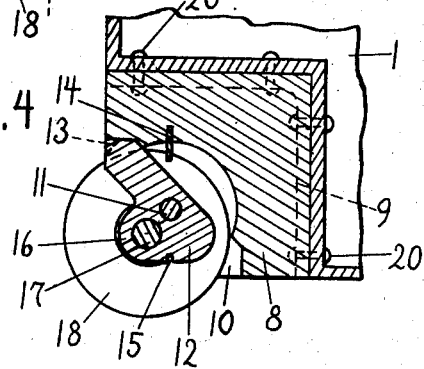
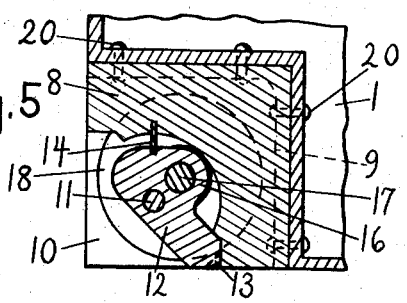
INVENTOR:
RUDOLPH KEIL
BY Maurice Bloch
ATTORNEY Patented Apr. 13, 1948

2,439,660

UNITED STATES PATENT OFFICE 2,439,660

WHEELED TRUNK AND THE LIKE

Rudolph Keil, Pelham Manor, N. Y.

Application June 19, 1946, Serial No. 677,860

4 Claims. (Cl. 280—37)

My invention relates to trunks, large suit cases or similar pieces of portable luggage which hitherto have been generally carried in lifted positions, and an object of my invention is to enable a person to move pieces of this kind conveniently without having to lift their weight.

Other objects are to provide a trunk or the like with a wheeled axle or shaft, to make it possible to move this trunk rollingly like a wheelbarrow or a cart, to make it unnecessary to move a heavy piece of luggage slidingly over the floor, and, thereby, to avoid most of the frictional resistance and any damage or wear of the luggage which may easily result from sliding movement.

A further object is to provide for optional movement of a trunk or the like by hand either by holding the trunk in lifted position or by rolling the trunk over the floor.

Still other objects are to provide a trunk or the like with a wheel or with coaxial wheels positioned near an edge of the trunk, to provide a wheeled trunk or the like which can rest on wheels and on an edge remote from the wheels, and to arrange the wheel or the wheels in a position where the axis of the same is located under the center of gravity of the trunk when the latter is slightly tilted around this axis.

Still further objects are to provide for two different positions of the wheel or the wheels, one where the wheels project beyond an edge of the trunk or out of the trunk body and one where the wheels are withdrawn or concealed in the body of the trunk, to avoid exposure of the wheels and any damage which projecting parts may suffer or inflict when the wheels are not used, and to provide for easy and quick conversion from the concealed position of the wheels into the position of use and vice versa.

Still further objects are to obtain these results with simple and reliable means, and to provide a structure which does not interfere with the conventional form or with the contents of a trunk or the like.

Still other objects and advantages will appear from the following description of an exemplifying embodiment of my invention, from the appended claims and from the accompanying drawing in which:

Fig. 1 shows a side view of an illustrative embodiment of my invention in a position adapted for rolling movement.

Fig. 2 shows another side view of the same embodiment in a condition adapted for carrying the trunk in lifted position, Fig. 2 being seen in the direction of the arrow 2 in Fig. 1.

Fig. 3 shows a view of the wheeled edge and the neighboring parts of the same embodiment on a larger scale, this view being also seen in the direction of the arrow 2 in Fig. 1, the wheels being in position of use.

Fig. 4 shows a cross-section taken along the line 4—4 in Fig. 3.

Fig. 5 shows the same as Fig. 4, except that the wheel is represented turned in concealed position.

Referring to the drawing, numeral 1 indicates the main body and 3 the cover of a container forming a trunk of any suitable structure. This structure may comprise a handle 5 affixed to a narrow short side of the body 1 and a handle 6 affixed to a narrow long side of this body. The walls of the trunk may be made of any suitable material and may have edges reinforced by layers 7 of metal, leather or the like.

Two corners of that side which is opposite to the side provided with the handle 5 have recesses in which metal pieces 8 are inserted and permanently affixed, for example by rivets 20. Each piece 8 has a cavity which has an opening at that edge of the trunk which runs from one of these recessed corners to the other. This cavity comprises a main space 9 and two less deep lateral extensions 10 of this space.

Parts of a shaft 11 which are connected as will be described later cross the extensions 10 in a direction parallel to the open edge of the piece 8, are separated by the space 9 and enter the lateral walls of this piece. These walls have co-axial bores in which the shaft 11 can rotate. This shaft may extend beyond the inner one of these walls through the adjacent wall of the trunk body 1; and the corresponding shaft belonging to the other piece 8 may form a continuation of the first shaft whereby both pieces are crossed by one shaft. Or the shafts may be divided into two independent parts, each crossing only one piece 8.

A lever 12 is affixed to each of the shafts 11 and is rotatable therewith. Preferably, the lever 12 comprises two identical or symmetrical lateral arms positioned in the lateral spaces 10 and a bar 13 connecting the ends of these arms across the space 9. In the position in which the wheels are used (shown in Figs. 1, 3 and 4), the lever 12 contacts the piece 8 at a surface of its cavity or of the extensions 10. This surface stops further movement of the lever 12 in that direction which is clockwise in Fig. 4.

From this position, the lever 12 can be turned around the axis of the shafts 11 in anti-clockwise direction until the lever contacts a similar surface positioned at the opposite side of the cavity.

In the shown embodiment, these two stopping surfaces are positioned symmetrical with respect to a plane through the shaft axis and the open edge of the piece 8. A turn of 180 degrees moves the lever 12 from one end position to the other. The second position shown in Figs. 2 and 5 is used when the wheels should be concealed as will be described later. The lever 12 may be secured in this position against unintentional dislocation by suitable means. For example, a small flat spring 14 the thickness of which is exaggerated in the drawing for the sake of clearer representation may be affixed to the ceiling of a space 10 in a suitable position whereby this spring snaps into a recess 15 provided in an arm of the lever 12 when the lever is positioned as shown in Fig. 5.

Each arm of the lever 12 has an extension 16 provided with a bore which is eccentric with respect to the shaft 11. A shaft or axle 17 is inserted in the two coaxial eccentric bores of the two arms of each lever 12. A small wheel or roller 18 is positioned around the shaft 16 and carried by this shaft. The wheel 18 is rotatable around the axis of the shaft 17 either by turning around this shaft or by rotating together with this shaft.

In the position shown in Fig. 4, the arm extension 16 is positioned at the outer side of the shaft 11, and the wheel 18 projects beyond the neighboring edge of the trunk both horizontally and vertically. In the position shown in Fig. 5, the extension 16 is turned to the inner side of the shaft 11, and the wheel as well as the lever 12 are completely withdrawn into the space 9, the diameter of the wheel and the eccentricity of its axis being suitably measured.

With the wheels 18 in this latter position, the trunk can be handled like an ordinary trunk, for example in the position shown in Fig. 2. The trunk may be lifted or carried by the handle 6 and may be shipped or stored in usual manner. During all these operations, the concealed wheels and levers are protected, are not exposed to injuries, can not scratch or indent other bodies and do not hinder close and even accumulation of several pieces of luggage.

In order to convert the trunk into rolling condition, the operator inserts the tip of a finger in one of the spaces 9, reaching behind the lever bar 13, and turns the lever in clockwise direction from the position shown in Fig. 5 into that shown in Fig. 4. Thereby, the lever arm affixed to this bar turn, the shaft 11 turns and moves the other lever 12 simultaneously and correspondingly. If the two levers 12 are not connected by a common shaft 11, each lever may be turned separately in the described manner. When the turning operation starts, the finger easily overcomes the slight resistance of the small spring 14 which may be idle in the position shown in Fig. 4, the proper position of the levers 12 being sufficiently secured in this latter position by the weight of the trunk.

After this conversion, the trunk can be easily wheeled, for example, in the position shown in Fig. 1. The trunk may be tilted during the rolling movement in any desired and convenient degree without the wheeled edge ever contacting the floor or any step that may be in the way of the movement. The rolling movement may be interrupted whenever desired and the trunk may temporarily rest on the wheels 18 and on the edge 19 of the trunk.

I desire it understood that my invention is not confined to the particular embodiment shown and described, the same being merely illustrative, and that my invention may be carried out in other ways without departing from the spirit of my invention as it is obvious that the particular embodiment shown and described is only one of the many that may be employed to attain the objects of my invention.

Having described the nature of my invention, what I claim and desire to protect by Letters Patent is:

1. A trunk or the like, comprising a portable container having a recess at one of its outer edges, a shaft carried by said container and crossing said recess, a lever carried by said shaft and turnable relatively to said container in a plane substantially perpendicular to said edge, and a wheel rotatably carried by said lever and having an axis positioned eccentrically with respect to the turning axis of said lever whereby turning of said lever shifts said wheel axis between two positions, one nearer to said edge than the other, said wheel having a diameter so measured that said wheel projects out of said recess when its axis is in said first position and is completely withdrawn into said recess when said wheel axis is in said other position.

2. A trunk or the like, comprising a portable container having two recesses, one near each end of one of the outer edges of said container, a shaft rotatably carried by said container and crossing said two recesses in a direction parallel to said edge, two levers affixed to said shaft in substantially radial directions, one being positioned in one of said recesses and the other in the other recess, and two wheels, one rotatably carried by one of said levers and the other by the other lever, said wheels having a common axis positioned eccentrically with respect to the axis of said shaft whereby turning of said shaft shifts said wheel axis between two positions, one nearer to said edge than the other, said wheels having diameters so measured that said wheels project out of said recesses when their axis is in said first position and are completely withdrawn into said recesses when said wheel axis is in said other position.

3. A trunk or the like, comprising a portable container having a recess at one of its outer edges, a shaft carried by said container and crossing said recess, a lever carried by said shaft and turnable relatively to said container in a plan substantially perpendicular to said edge, and a wheel rotatably carried by said lever and having an axis positioned eccentrically with respect to the turning axis of said lever whereby turning of said lever shifts said wheel axis between two positions, one nearer to said edge than the other, said wheel having a diameter so measured that said wheel projects out of said recess when its axis is in said first position and is completely withdrawn into said recess when said wheel axis is in said other position, said lever, in said first position, contacting said container in the turning direction.

4. A trunk or the like, comprising a portable container having a recess at one of its outer edges, a shaft carried by said container and crossing said recess, a lever carried by said shaft and turnable relatively to said container in a plane substantially perpendicular to said edge, and a wheel rotatably carried by said lever and having an axis positioned eccentrically with respect to the turning axis of said lever whereby turning of said lever shifts said wheel axis between two positions, one nearer to said edge than the other, said wheel having a diameter so measured that said wheel projects out of said recess when its axis is in said first position and is completely withdrawn into said recess when said wheel axis is in said other position, said lever, in said other position being withdrawn into said recess.

RUDOLPH KEIL.

REFERENCES CITED

The following references are of record in the file of this patent:

UNITED STATES PATENTS

| Number | Name | Date |
| --- | --- | --- |
| 362,868 | Roberts | May 10, 1887 |
| 1,197,190 | Dunn et al. | Sept. 5, 1916 |
| 1,808,864 | Pinheiro | June 9, 1931 |
| 2,358,007 | Henley | Sept. 12, 1944 |